(12) United States Patent
Bergeron et al.

(10) Patent No.: US 6,552,809 B1
(45) Date of Patent: Apr. 22, 2003

(54) POSITION ENCODING OPTICAL DEVICE AND METHOD

(75) Inventors: Alain Bergeron, Sainte-Foy (CA); Michel Doucet, Sainte-Foy (CA); Donald Prévost, Cap-Rouge (CA)

(73) Assignee: Institut National d'Optique, Ste-Foy (CA)

( * ) Notice: Subject to any disclaimer, the term of this patent is extended or adjusted under 35 U.S.C. 154(b) by 329 days.

(21) Appl. No.: 09/664,356

(22) Filed: Sep. 18, 2000

(51) Int. Cl.[7] .............................................. G01B 11/24

(52) U.S. Cl. ...................... 356/601; 356/602; 356/614; 356/623

(58) Field of Search ................................ 356/601, 602, 356/614, 623; 359/619

(56) References Cited

U.S. PATENT DOCUMENTS

| | | |
|---|---|---|
| 3,500,055 A | 3/1970 | Russell et al. |
| 3,702,471 A | 11/1972 | Kennedy et al. |
| 4,025,197 A | 5/1977 | Thompson |
| 4,180,704 A | 12/1979 | Pettit |
| 4,351,589 A | 9/1982 | Chavel et al. |
| 4,388,613 A | 6/1983 | Rush et al. |
| 4,405,238 A | 9/1983 | Grobman et al. |
| 4,830,485 A | 5/1989 | Penney et al. |
| 4,948,968 A | 8/1990 | Matsui |
| 4,971,442 A | 11/1990 | Okutani et al. |
| 5,334,978 A | 8/1994 | Halliday |
| 5,497,226 A | 3/1996 | Sullivan |
| 5,539,446 A | 7/1996 | Sullivan |
| 5,701,005 A | * 12/1997 | Meyers ..................... 250/208.1 |
| 5,751,492 A | * 5/1998 | Meyers ........................ 359/619 |
| 5,939,716 A | * 8/1999 | Neal ............................ 250/251 |
| 5,978,418 A | 11/1999 | Greve et al. |
| 6,080,990 A | 6/2000 | Watanabe et al. |

FOREIGN PATENT DOCUMENTS

| | | |
|---|---|---|
| DD | DD 283 001 | 9/1990 |
| EP | EP 490 206 | 6/1992 |

OTHER PUBLICATIONS

N.A. Agarkova et al., The Design of a Digital Electro–Optical Displacement Sensor, Optical Technology, September 1971, pp. 532–534, vol. 38, No. 9.

(List continued on next page.)

Primary Examiner—Evelyn A Lester
Assistant Examiner—Jack Dinh
(74) Attorney, Agent, or Firm—Ogilvy Renault; James Anglehart (57) ABSTRACT

A simple optical position encoder of detecting the position of a light spot generated by any light source of either light generating or light reflecting type, directly in a binary or other encoded format at very high speed, comprises a diffractive optical element including an array of diffractive cells each being formed by a unique arrangement of diffractive sub-cells and being disposed at a predetermined position with respect to a predetermined reference point on the diffractive optical element. Each cell is capable of generating a unique optical diffraction pattern when illuminated. When an image of the light spot is formed on the diffractive element, at least one cell is positioned to receive the light spot input image, generating its unique optical diffraction pattern accordingly at an output image plane, where one or more optical detectors are disposed. The detectors are responsive to the unique optical diffraction pattern to generate one or more encoded signals indicative of the position of the light spot image with respect to said reference point. Described applications of the basic embodiment of the position encoder includes absolute three-dimensional position measurement of a light spot formed on a object, position encoding of a light peak generated by an optical processor or correlator and absolute/relative position detection of a light spot generated by or reflected onto an object in a two-dimensional coordinates system.

40 Claims, 5 Drawing Sheets

OTHER PUBLICATIONS

Werner Scholz, Bandstands–Ermittlung durch optische Bandmarken, Funkschau, 1976, Heft 1, Magnettontechnik, pp. 42–44.

O.E. Lanz, Electro–optic Sensor for Position Detection and Object Identification, pp. 95–106, 1977, Automation technology with microprocessors Interkans Congress October 1977.

Von Hartmut Janocha et al., Universally usable position measuring system with analogue displaying, position sensitive photodiodes, Technisches Messen tm, 1979, Heft 11, pp. 415–420.

R. Ogden, A high resolution optical shaft encoder, Journal of the Institution of Electronic and Radio Engineers, vol. 55, No. 4, pp. 133–138, April 1985.

Ulrich Griebel et al., A new method to determine Accuracy and Repeatability of Robots, presented at the IASTED Symposium, Robotics and Automation, Santa Barbara, May 29–31, 1985, pp. 253–257.

Thomas Böhme, Digitalpotentiometer zur Positionsanzeige mit Mikrocomputer, Elektroniker, Nr. 8, 1987, pp. 86–88.

D. Varshneya et al., Applications of time and wavelength division multilplexing to digital optical code plates, SPIE, vol. 838, Fiber Optic and Laser Sensors V, 1987, pp. 210–213.

Philippe Aubert et al., Monolithic Optical Position Encoder with On–Chip Photodiodes, IEEE Journal of Solid–State Circuits, vol. 23, No. 2, April 1988, pp. 465–473.

T. Smith et al., An Integrated Linear Position Sensitive Detector with Digital Output, IEEE, 1991, pp. 719–722.

T.A. Kwa et al., Optical angular displacement sensor with high resolution integrated in silicon, Sensors and Actuators A. 32 (1992), pp. 591–597.

Alain Bergeron et al., Dammann–grating–based optodigital position converter, Optical Society of America, Optics Letters, vol. 20, No. 18, Sep. 15, 1995, pp. 1895–1897.

K. Yamamoto et al., New Structure of Two–Dimensional Position Sensitive Semiconductor Detector and Application, IEEE Transactions on Nuclear Science, vol. NS–32, No. 1, Feb. 1985, pp. 438–442.

\* cited by examiner

POSITION ENCODING OPTICAL DEVICE AND METHOD

FIELD OF THE INVENTION

The present invention relates to the field of optical position detecting devices, and more particularly to such devices capable of encoding the position of a light spot generated by a light source, which find applications in 3D vision and object measurement (profilometry), object detection, pattern recognition and target tracking.

DESCRIPTION OF THE PRIOR ART

Position detectors including components whose relative position or movement is measured are well known. Such detectors have been abundantly described in the literature, as by N. A. Agarkova et al. in "The design of a digital electro-optical displacement sensor" Optical Technology, vol. 38, no. 9, 1971, pp. 532–534; by W. Scholz in "Determining tape position with optical markers" Magnettontechnik, Funkschau, Heft 1, 1976, pp. 42–44; by R. Ogden in "A high resolution optical shaft encoder" Journal of IERE, vol. 55, no. 4, 1985, pp. 133138; by U. Griebel et al. in "A new method to determine accuracy and repeatability of robots" Proceedings of the IASTED, 21–26 June 1985, Lugano, Switzerland; by T. Bohme in "A digital potentiometer for position indication using a microcomputer, Elektroniker, Nr. 8, 1987, pp. 86–88; by D. Varshneya et al. in "Applications of time and wavelength division multiplexing to digital optical code plates" SPIE, vol. 838, 1987, pp. 210–213; by P. Auvert et al. in "Monolithic optical position encoder with on-chip photodiodes" IEEE Journal of Solid-State Circuits, vol. 23, no. 2, 1988, pp. 465–473; and by A. Kwa et al. in "Optical angular displacement sensor with high resolution integrated in silicon" Sensors and Actuators A, vol. 32, 1992, pp. 591–597. Examples of such moving part-based position detectors are also disclosed in patent documents, namely in U.S. Pat. No. 3,500,055 issued on Mar. 10, 1970 to Russell et al.; in U.S. Pat. No. 3,702,471 issued on Nov. 7, 1972 to Kennedy et al.; in U.S. Pat. No. 30 4,180,704 issued on Dec. 25, 1979 to Pettit; in U.S. Pat. No. 4,388,613 issued on Jun. 14, 1983 to Rush et al.; in U.S. Pat. No. 4,405,238 issued on Sep. 20, 1983 to Grobman et al.; in U.S. Pat. No. 4,971,442 issued on Nov. 20, 1999 to Okutani et al.; in U.S. Pat. No. 4,948,968 issued on Aug. 14, 1990 to Matsui; in U.S. Pat. No. 5,497,226 issued on Mar. 5, 1996 to Sullivan; in U.S. Pat. No. 6,080,990 issued to Watanabe et al. on Jun. 27, 2000; in Deutche Democratic Republic Patent Specification no. 283001, 1985, naming Rossler et al. as co-inventors; and in European Patent Specification published under no. 490206 on Jun. 17, 1992, naming Durana et al. as co-inventors.

In many fields there is a need for finding the position of a light spot or peak of a relatively small size, wherein known position detectors involving lo relative movement between detector components cannot be used. Some applications can be found in artificial vision where a light beam is scanned over a surface or a volume and the position of the spot is indicative of either the position or the thickness of an object. In pattern recognition, applications can be found in optical processing (e.g. optical correlator) where the optical device transposes the presence of an object into a sharp light peak. In other applications such as in the fields of object detecting and target tracking, a light source or the illuminated part of an object is imaged as a moving small spot whose position must be rapidly detected.

Existing technologies for light spot position detection generally use three different approaches.

According to a first one, a scene containing the luminous spot or peak is acquired with a video camera. The image is then processed by a computer to detect the maximum intensity value to find the corresponding position. However technologies using this approach are generally characterized by limitations related to processing speed, system complexity and cost. Speed limitations are due to the acquisition process with the video camera and to the data processing performed by the computer. For conventional existing cameras, the acquisition process typically takes $\frac{1}{30}$ sec. Although high-speed cameras with image acquisition frequency around a few kHz are available, they may not be suitable for high rate scanning or fast moving spot applications, such as object tracking. Furthermore, even using a high-performance, high-speed camera, the processing time necessary to detect the maximum intensity value from raw image signals to find the corresponding position of the light spot may still significantly limit detection performance of the system. Such system requiring a high performance camera with a computer running particular analysis software or equivalent high level processing instrumentation, it may be complex to program, calibrate and/or operate, as well as expensive. Such a video position sensor is proposed by E. Lanz in "Electro-optic sensor for position detection and object identification" Automation Technology with Microprocessors, Interkawa congress 1977, pp. 95–106, which sensor is based on electronic sequential processing of a two-dimensional video signal.

Another way to proceed is to use position-sensitive electronic devices. A photodiode-based position measuring system is taught by H. Janocha in "Universally usable position measuring system with analog displaying position sensitive photodiodes" Technisches Messeen tm, Heft 11, 1979, pp. 415–420. Such system combines photodiodes that are sensitive to the two-dimensional position of a light source, with an electronic processing circuit generating a position indicative analog signal. Such system is disadvantageous because additional encoding is required to further process the position signal with a digital computer, therefore increasing processing time. A one-dimensional position detector requiring signal pre-processing to generate a digital output is also described by Smith et al. in "An integrated linear position sensitive detector with digital output" Transducers 1991, Digest of Technical Papers, 24–27 June 1991, San Francisco, pp. 719–722. A coded aperture light detector for use with a three-dimensional camera is disclosed in U.S. Pat. No. 4,830,485 issued on May 16, 1989 to Penney et al., which detector provides a direct digital representation of a range or height position of a reflecting surface of an object. A light spot reflected from the surface is optically spread into a line segment so it can be shared among a number of light detection channels coupled through a segmented fiber optic bundle to a corresponding number of photo-multipliers or solid state detectors. Although not requiring pre-processing, the proposed detector is significantly limited in its resolution due to the mechanical coupling required between each fiber optic of the bundle and each corresponding channel of the coded aperture. Furthermore, several rows of channels being required on the coded aperture to generate a multi digit signal, such detector would be hardly practicable for bi-dimensional spot positioning. Another position-sensitive electronic device is disclosed by Yamamoto et al. in "New Structure of Two-dimensional Position Sensitive Semiconductor Detector and Application" IEEE Trans. Nucl. Sci., NS-32, 1985, pp 438–442. The voltage output of such semiconductor device depends on the position of the centroid of the illumination pattern projected on it. This device has the potential to be very fast (around 100 kHz) and is less complex than the camera/processing computer system. However, in computing the mass center of the peak, this device is more sensitive to noise coming either from background of from other sources showing lower intensity. Moreover, resolution and speed are affected by the intensity of the light peak.

The third detection scheme is based on the use of diffractive devices such as diffraction gratings. One-dimensional and two-dimensional light spot position detecting devices are disclosed in U.S. Pat. No. 4,025,197 to Thompson. The one dimensional detecting device disclosed uses a first linear grating disposed before the focal point of an incident laser beam, the modulated emerging beam being directed to a second linear grating disposed in parallel relationship with the first grating. The device include an optical detector coupled to an electronic circuit for generating displacement or position data from the detected diffraction pattern after passing through both linear gratings. The two-dimensional position detecting device as taught by Thompson uses a first X-Y grating formed by two crossing sets of parallel lines and disposed before the focal point of an incident laser beam, a beam splitter receiving the laser beam modulated by the first X-Y grating to produce two separate beams that are respectively directed to an X grating and an Y grating, the former having its lines disposed optically parallel to one of the two sets of parallel lines on the X-Y grating, the latter having its lines disposed optically parallel to the other of the two sets of parallel lines on the X-Y grating. The X grating is followed by a first detector provided with a first electronic circuit for generating displacement or position data from the detected diffraction pattern after passing through the X-Y grating and X grating. In a same manner, the Y grating is followed by a first detector provided with a first electronic circuit for generating displacement or position data from the detected diffraction pattern after passing through the X-Y grating and X grating. However, this device using many optical elements, it cannot be easily built as a compact package, as required in many applications. Another diffractive device is taught by Bergeron et al. in "Damman-grating-based optodigital position converter" Optics Letters, vol. 20, 1995, pp. 1895–1897. Using binary patterns and replicated images, the disclosed position converter can be extremely fast (1–100 MHz). However, this converter using also many optical elements, it cannot be easily built as a compact package. Furthermore, its optical elements requiring precise alignment, its use may be laborious and limited to highly skilled technicians.

SUMMARY OF THE INVENTION

It is a main object of the present invention to provide a simple, optical device for encoding the position of a light spot.

It is another object of the invention to provide a light spot position encoding device that integrates processing, compression and conversion of data entirely optically, thus avoiding the use of electronic hardware for processing large amount of data;

It is another object of the invention to provide a light spot position encoding device and method exhibiting parallel optical processing capabilities to provide high speed position encoding, without requiring generation of a replicated image of the scene containing the light spot.

It is a further object of the invention to provide a light spot position encoding optical device that is of a compact, light weight design and comprising no moving part.

It is a still further object of the invention to provide light spot position encoding devices and methods capable of encoding position with respect to one-dimensional, two-dimensional or three dimensional coordinates reference system.

The invention proposed herein provides a simple optical device and method of detecting the position of a light spot generated by any light source of either light generating or light reflecting type, directly in a binary or other encoded format at very high speed.

According to the above main object, from a broad aspect of the present invention there is provided an optical device for encoding the position of a light spot image formed at an input image plane, the device comprising a diffractive optical element disposed within the input image plane and including an array of diffractive cells each being disposed at a predetermined position with respect to a predetermined reference point on the diffractive optical element, each said cells being capable of generating a unique optical diffraction pattern when illuminated, at least one of the cells being positioned to receive the light spot input image generating its unique optical diffraction pattern accordingly at an output image plane. The device further comprises one or more optical detectors disposed at the output image plane and responsive to the unique optical diffraction pattern to generate one or more encoded signals indicative of the position of the light spot image with respect to the reference point.

From a further broad aspect of the invention, there is provided an optical device for encoding the position of a light peak generated by an optical processor receiving an image to be processed as generated by an imaging device illuminated by a laser source, said processor comprising first Fourier transform means for performing the Fourier transform of the input image to generate a corresponding transformed input image in the spatial frequency domain within an area defined by a Fourier transform filter plane, optical mask means disposed within said area, said second optical mask means implementing a filter mask function to generate a combined image in the spatial domain, and second Fourier transform means for performing the inverse Fourier transform of the combined image to generate the light peak at a peak image plane. The optical device comprises a diffractive optical element disposed within the peak image plane and including an array of diffractive cells each being disposed at a predetermined position with respect to a predetermined reference point on the diffractive optical element, each said cells being capable of generating a unique optical diffraction pattern when illuminated, at least one of said cells being positioned to receive the light peak and generating its unique optical diffraction pattern accordingly at an output image plane. The device further comprises one or more optical detectors disposed at the output image plane and responsive to the optical diffraction pattern to generate one or more encoded signals indicative of the position of said light peak with respect to the reference point.

According to a still further broad aspect of the invention, there is provided a method of encoding the position of a light spot, said method comprising the steps of: a) forming an image of the light spot at a corresponding position within an input image plane and with respect to a predetermined reference point of said plane; b) generating a unique optical diffraction pattern associated with said corresponding position at an output image plane; and c) detecting the unique optical diffraction pattern to generate one or more encoded signals indicative of the position of the light spot image with respect to the reference point.

Conveniently, said detecting step c) includes separately detecting complementary portions of the unique optical diffraction pattern to generate corresponding ones of said encoded signals.

BRIEF DESCRIPTION OF THE DRAWINGS

Preferred embodiments of the present invention will be now described in detail below with reference to the accompanying drawings in which.

DETAILED DESCRIPTION OF THE PREFERRED EMBODIMENTS

Figure 2:
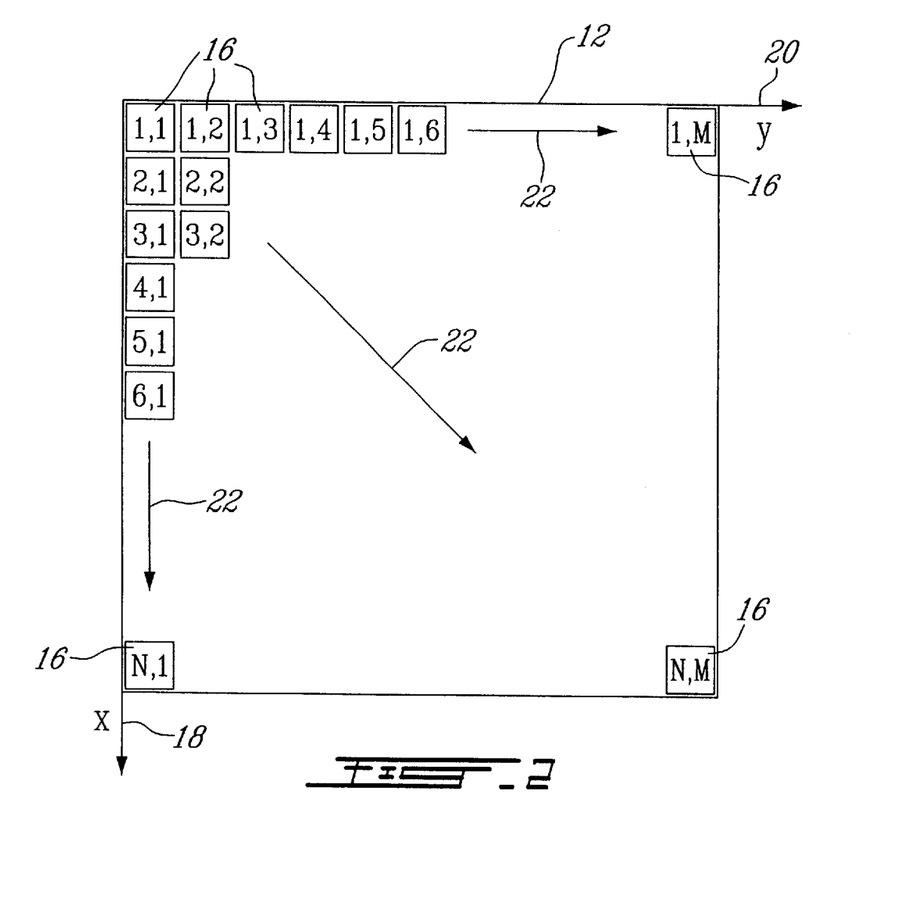
FIG. 2 is a plan view of a two-dimensional diffractive element provided on the position encoding optical device of FIG. 1, showing the arrangement of diffractive cells forming a two-dimensional array.
Figure 3:
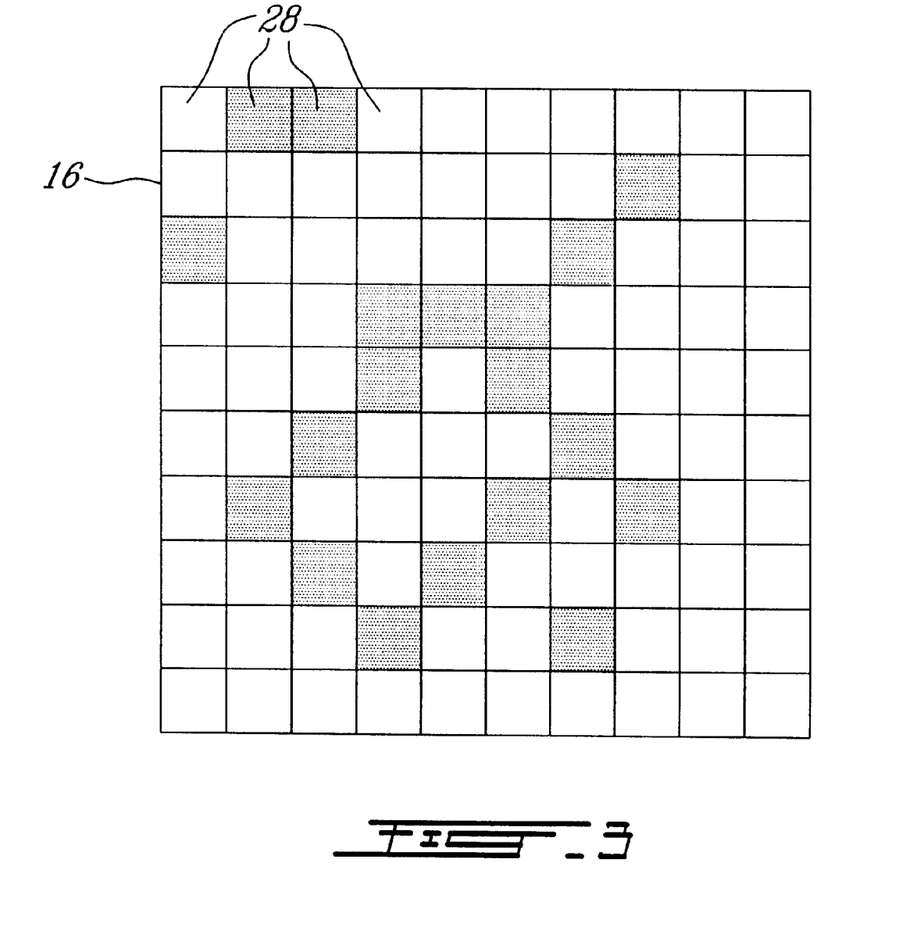
FIG. 3 is a plan view of a single one of diffractive cells of FIG. 2, showing an example of diffraction sub-cells arrangement forming the cell.

The principle on which the present invention is based will be now explained in detail with reference to FIGS. 1 to 3. In the basic embodiment shown, the position encoding device 10 comprises a diffractive optical element 12 disposed within an input image plane represented by dotted lines 14, at which plane an image of a light spot the position of which is to be encoded, is formed, as will be explained later in more detail with reference to FIGS. 4 to 6. The optical element 12 includes an array of diffractive cells 16, as better shown in FIG. 2, which represents a two-dimensional array of N×M diffractive cells, wherein N represents the number of lines forming the array and defining its nominal line resolution with respect of axis X designated at 18, and M represents the number of columns forming the array and defining its nominal column resolution with respect to axis Y designated at 20. For a two-dimensional array, each cell 16 may be associated with a specific address (x,y) with x=1,N and y=1,M, the N×M cells being adjacently disposed in a very close relationship to substantially cover the entire surface of the array as indicated by arrows 22. While a two-dimensional array of diffractive cells 16 is depicted in FIG. 2, the diffractive element 12 shown in FIG. 1 can be a one-dimensional, linear array of similar diffractive cells, for applications where position with respect to only one axis is required. Moreover, although the bi-dimensional diffractive element 12 shown in FIG. 2 is based on a X - Y Cartesian reference coordinates system, any other suitable array configuration based on any other one-dimensional or two-dimensional reference coordinates system such as polar (radius/angle), log-log or log-polar coordinates systems may be used. Turning again to FIG. 1, each cell 16 is disposed at a predetermined position with respect to a predetermined reference point 24 on the diffractive optical element 12, which is conveniently chosen at the intersection of an optical axis 26 of the device 10.

According to the present invention, each cell 16 is capable of generating a unique optical diffraction pattern when illuminated. Although the position encoding device 10 shown in FIG. 1 is provided with a diffractive optical element 12 employing transmissive diffractive cells 16, reflective cells may also be used. Although any suitable diffractive structure may be employed to obtain a unique optical diffraction for each cell 16, each diffractive cell 16 is preferably formed by a unique arrangement of diffractive sub-cells forming pixels that may be conventional microgratings, an example of which unique arrangement of sub-cells 28 being shown in FIG. 3. Each or a group of sub-cells 28 may implement arbitrarily complex values, as conveniently represented by different shades covering some of the sub-cells shown, to define a resulting diffractive function for the cell which provides a unique diffraction pattern associated with its position with respect to the reference point 24 shown in FIG. 1. A specific cell may also be formed by sub-cells all showing identical complex values, provided the resulting diffraction pattern is unique to the specific position of that cell. For the example shown in FIG. 1, it can be seen that at least one cell 16' is positioned to receive the light spot image, which is arbitrarily shown to be formed at the reference point 24 in the instant example. Accordingly, the cell 16' is caused to generate its unique diffraction pattern at an output image plane, represented by dotted lines 30, which output image plane is preferably the far-field image plane as inherently determined by the diffractive cells 16. In order to reduce the length of the device, there is provided an output optical element in the form of a lens 32 for collecting, directing and focusing the optical diffraction pattern at the far-field image plane at a reduced distance from diffractive element 12 corresponding to a focal length behind lens 32. The optical diffractive element 12 should show sufficient resolution to encode each cell. For example, for a bi-dimensional array, a typical cell resolution can be about 32×32 pixels to encode at least 1024 positions along each axis. Hence, a 1024×1024 resolution device would require cells of 32 μm×32 μm for a total area of about 32.8 mm.

The device further comprises one more conventional optical detectors 34 disposed at the output image plane 30, which detectors 34 are responsive to the unique optical diffraction pattern to generate at respective outputs 36 one or more encoded signals indicative of the position of the light spot image with respect to reference point 24. Any suitable optical detector that is sensitive and fast enough to provide reliable signal detection can be used. Because the light spot image is formed on at least one specific cell 16' of the diffractive element 12, a mapping between the position of the light spot image and the specific diffraction pattern generated can be achieved. As mentioned before, reflective diffractive cells can be used instead of transmissive cells, by disposing lens 32 and detectors 34 in front of diffractive optical element 12, while avoiding incident light to be obstructed. The light forming the image as transmitted through or reflected by a diffractive cell 16' is modulated accordingly to produce the corresponding unique diffraction pattern, as a result of the Fourier transform of the diffractive function implemented into the illuminated diffractive cell. Each diffractive cell 16 must transmit or reflect enough energy to allow signal detection. The encoded signal may be then sent to a data processor 37 for performing other derivations, as will be explained later in more detail.

Figure 1:
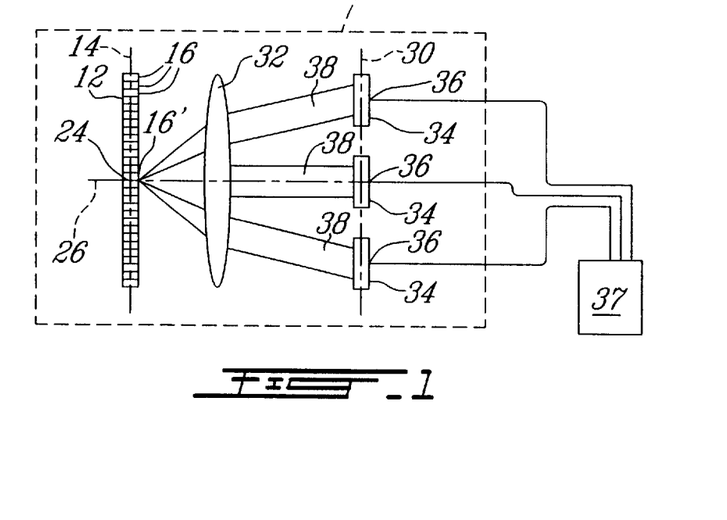
FIG. 1 is a schematic side view of a basic first embodiment of a position encoding optical device according to the invention.

In order to maximize position encoding capacity, the optical device 10 includes a plurality of optical detectors 34 that are responsive to respective complementary portions of the unique optical diffraction pattern, the projections of which complementary portions or light beams are designated at 38 in FIG. 1. Preferably, at least one of these pattern complementary portions is characterized by an intensity value included within one of a pair of separate intensity value ranges each corresponding to a respective one of binary code values, for generating a corresponding binary encoded signal. In other words, the diffraction pattern is chosen to represent a number in binary format compatible with a digital data processor. According to the simplest case, the first intensity range corresponds to an absence of complementary beam, while the second range corresponds to the presence of complementary beams having an intensity higher than a threshold inherent to the detector 34. For example, a single light spot incident to a particular diffractive cell 16 can be modulated into three light spots representing bits "111", thereby encoding the corresponding position of the light spot image. When the light spot image is displaced, the diffraction pattern is modified accordingly as another diffractive 16 is illuminated. Since each diffractive pattern is associated with a specific position in binary code, then the generated binary code changes as the position of the light spot image is varying. In disposing the detectors 34 at predetermined positions corresponding to the complementary portions of the unique diffractive pattern, binary encoded signals indicative of the position of the light spot image with respect to reference point 24 can be generated. According to an alternative implementation, at least one of the complementary portions of the optical diffraction pattern can be characterized by an intensity value included within a continuous range of intensity values, wherein at least one of detectors 34 generates an analog encoded signal, so that an encoding sequence can be increased linearly. For example, the detectors 34 may be chosen to provide uniform position response on a certain intensity range and a linear response over another intensity range. Combinations of digital and analog encoded signals are also contemplated.

It is to be understood that the detectors 34 may be disposed either in a linear arrangement or in a bi-dimensional arrangement according to the spatial distribution exhibited by the diffractive patterns produced by the diffractive cells 16. It can be appreciated that the device response speed is essentially limited by the output response characteristics of the chosen optical detectors 34, due to the direct optical encoding provided by the device, without involving data pre-processing as needed by the position encoding devices of the prior art. Therefore, the device according to the present invention is capable of adequately detect and encode very fast moving light spot image, which feature is useful in many application such as object tracking.

While only Log2N+Log2M (rounded to the next integer) detectors are required to encode the basic N×M cells nominal resolution of a bi-dimensional diffractive element 12 as shown in FIG. 2, a higher resolution may be obtained using digital interpolation. When the light spot image overlaps two adjacent cells 16, the least significant bit of the encoded signal as generated by the associated detector 34 corresponds to a light intensity value between 0 and 1, proportionally to the ratio of cell areas exposed according to a substantially linear function. This feature can be employed advantageously to improve the resolution of the device, above the nominal resolution of the diffractive element, which nominal resolution is defined by the N×M cells in a bi-dimensional element 12 such as described before. Although only one point-like light source should be preferably present at a time to maximize efficiency, multiplexing strategies can be also used for applications involving several light sources operating simultaneously. Furthermore, spectral band characteristics of light sources used should be sufficiently narrow to maximize response and resolution performance of the diffractive element 12.

Figure 4:
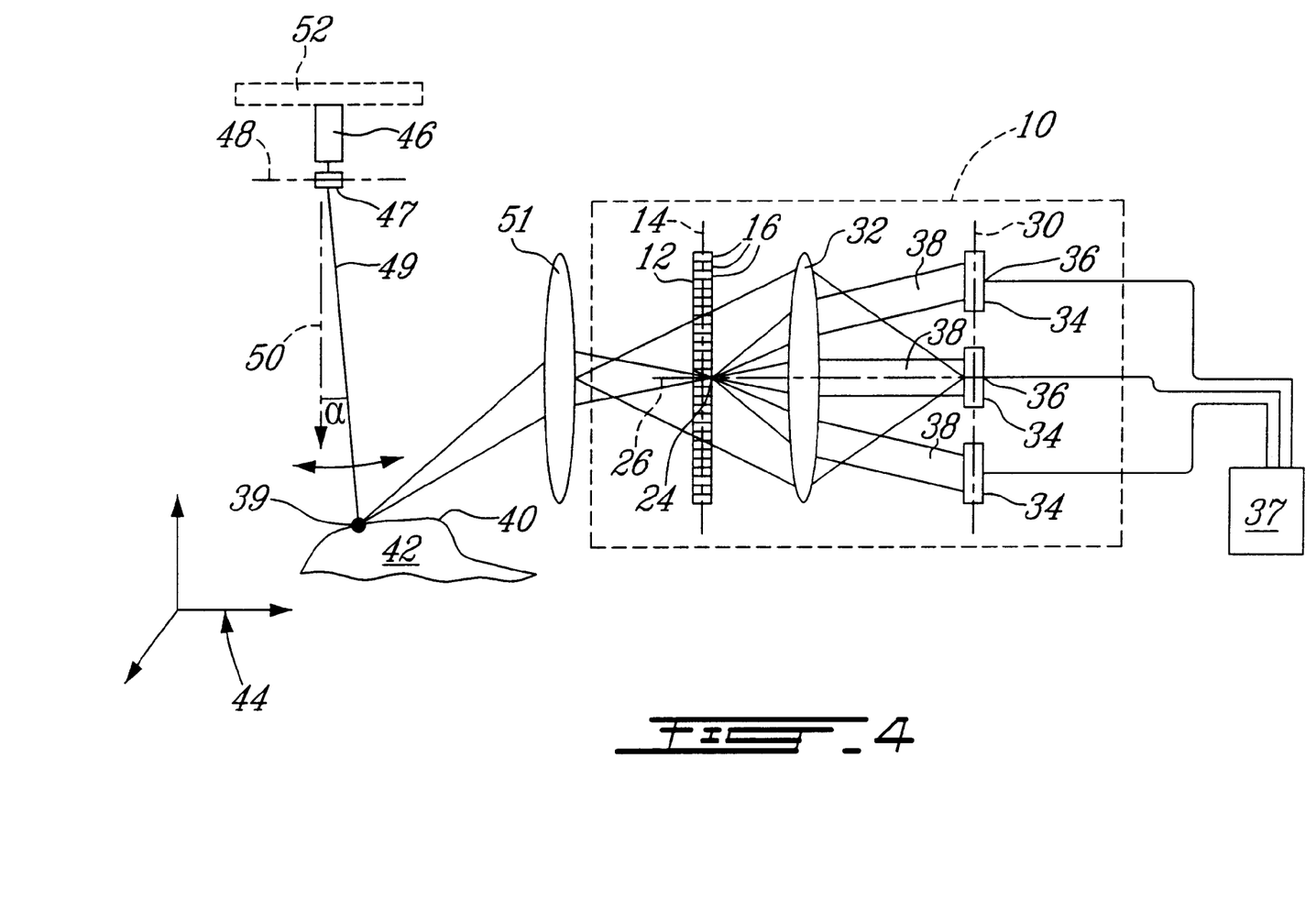
FIG. 4 is a schematic side view of a second embodiment of a position encoding optical device according to the invention, which provides absolute three-dimensional position measurement of a light spot formed on a object.
Figure 5:
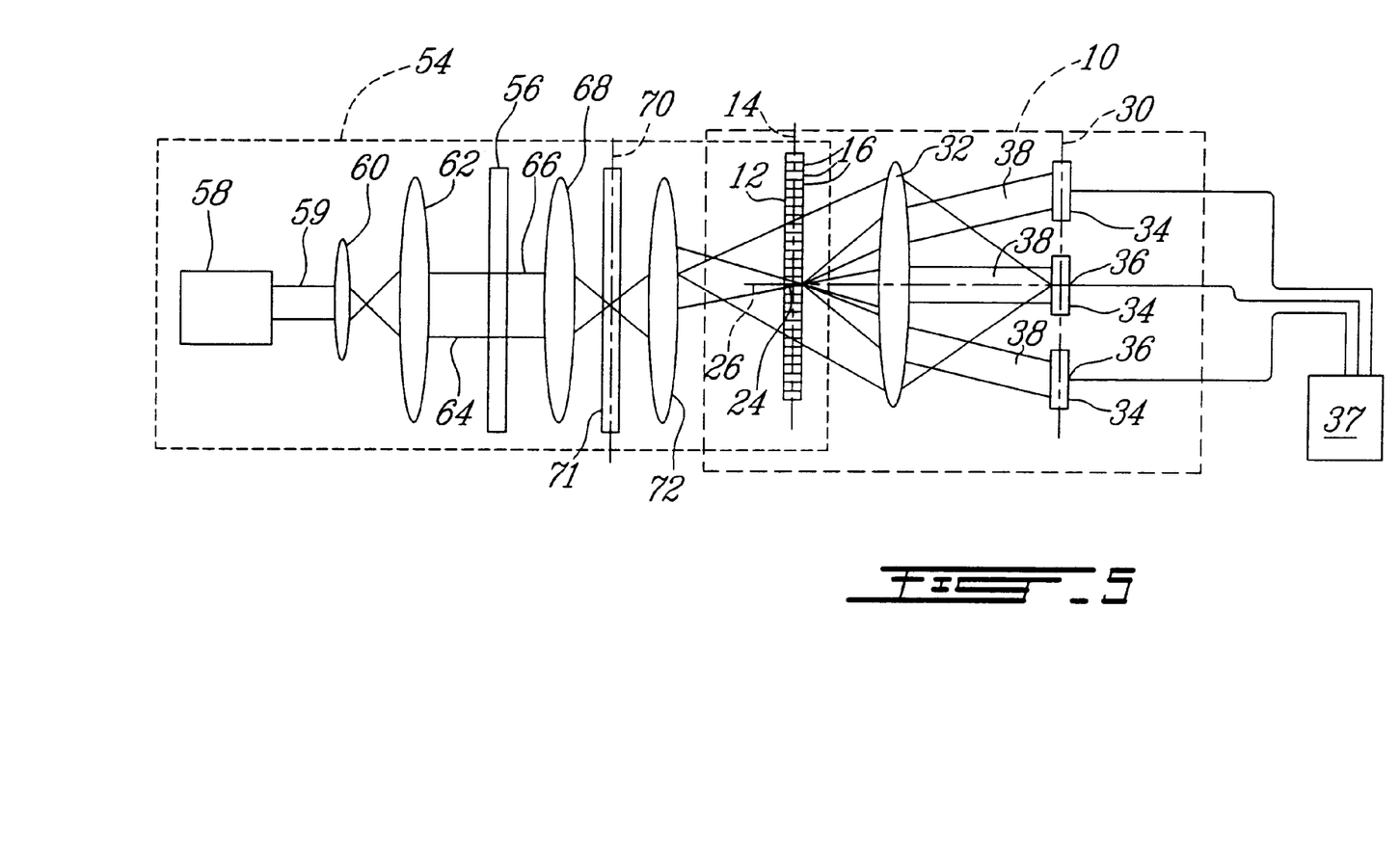
FIG. 5, is a schematic side view of a third embodiment of a position encoding optical device according to the invention, which provides encoding of the position of a light peak generated by an optical processor.
Figure 6:
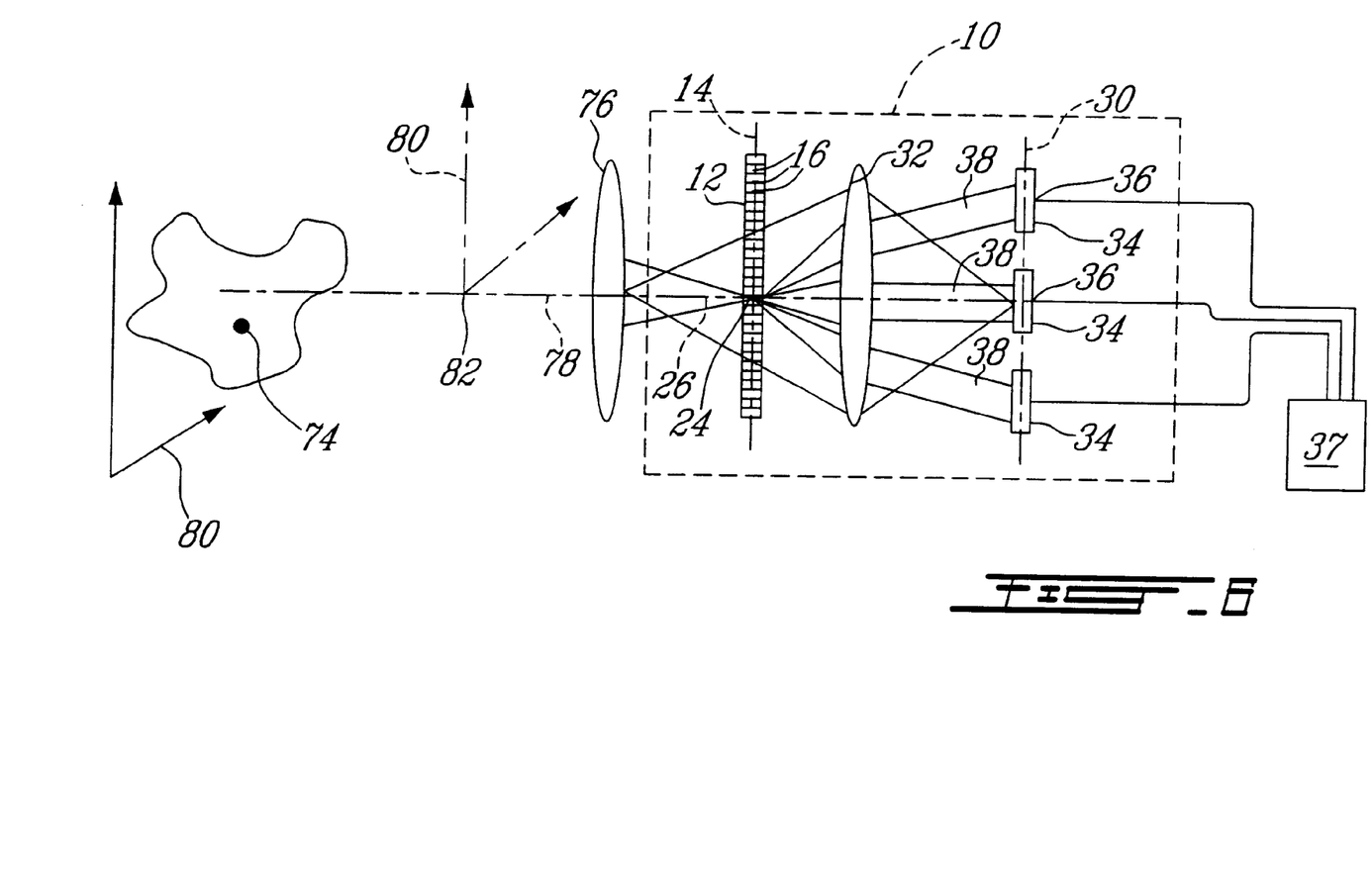
FIG. 6, is a schematic side view of a third embodiment of a position encoding optical device according to the invention, which provides an indication of the absolute/relative position of a light spot generated by or reflected onto an object in a two-dimensional coordinates system.

Some of the numerous applications of the above-described basic embodiment will be now presented with reference to FIGS. 4 to 6, in which the same reference numerals as found in FIG. 1 have been reproduced.

In FIG. 4, the position detector 10 is used to provide absolute three-dimensional position measurement (3D vision) of a light spot 39 formed at the surface 40 of an object 42. In this embodiment, the data processor 37 is responsive to the encoded signals generated by the detectors 34 to derive therefrom using triangulation techniques a further signal indicative of an absolute position of the light spot 39 in a three-dimensional coordinates reference system generally designated at 44. The light spot 39 is produced by a laser 46 provided with beam scanning element 47 at a reference plane 48 for projecting a laser beam 49 toward the reflecting surface 40 of object 42 and along a direction of incidence forming a predetermined angle $\alpha$ with respect to a reference direction defined by axis 50. As well known in the art, 3D vision using triangulation calculation is essentially based on the principle that knowing angle $\alpha$, there is a direct relation between the distance separating the reference plane 48 of the laser and a scanned point of the surface 40 as measured along reference axis 50 in one hand, and reflected light spot image shift from a corresponding reference point as observed at the image plane 14 in the other hand. The beam scanning element 47 is used for varying the direction of incidence of the laser beam to scan the surface 40 of object 42 forming light spot 39. There is provided an input optical element in the form of a lens 51 for forming the light spot image at input image plane 14. The data processor 37 is programmed to repeatedly derive the further signal indicative of the absolute position of light spot 39 in reference system 44 as surface 40 is scanned, to measure the 3D profile thereof. In an alternate embodiment, some mechanical device such as linear actuator 52 may be provided for imparting a relative movement between laser 46 and object 42 to scan the surface thereof reflecting the light spot accordingly. In such alternate embodiment, a beam-scanning element 47 is not necessary, since angle $\alpha$ is kept constant.

In FIG. 5, the position detector 10 is used to encode the position of a light peak generated by an optical processor generally designated at 54 receiving an image to be processed as generated by an imaging device 56 illuminated by a laser 58 or laser-diode, which could be of a He-Ne type or any other suitable type, for generating a beam 59 of coherent light that is directed toward a collimator formed by an objective 60 followed by a collimating lens 62 for directing a collimated beam 64 of coherent light toward input imaging device 56. For example, in a pattern recognition application, the input imaging device can be an object characterized by a pattern that was applied thereon, and for which validation or identification of that particular pattern has to be made using one or more known reference patterns. For doing so, the pattern may be displayed on the object if such object is a display device or two spatial light modulator allowing the pattern to be optically revealed either through coherent light transmission forming a beam 66 as in the example shown in FIG. 5, or through coherent light reflection by setting an appropriate incident light angle with respect to the applied pattern. The optical processor 54 is a four-$f$ correlator in the example shown, including a first lens 68 disposed in front of input imaging device 56 and having its optical plane being distant from the optical plane of imaging device 56 by a length (f), for performing the Fourier transform of the input image to generate a corresponding transformed input image in the complex spatial frequency domain, within an area defined by a Fourier transform filter plane represented by dotted lines 70, which plane is also distant from the optical plane of first lens 68 by one focal length (f). Disposed within the area defined by filter plane 70 is a filter mask 71 implementing a filter mask function to generate a combined image in the spatial domain. The optical processor 54 includes a second lens 72 having its optical plane laying two focal length (2f) from the optical plane of first lens 68, for performing the inverse Fourier transform of a combined image formed within the area defined by filter plane 70. The processed image, in the form of one or more spatially distributed peaks resulting from the inverse Fourier transform of the combined image, is captured by the diffraction element 12 provided on the position encoding device 10 in accordance with the invention, to generate at outputs 36 one or more encoded signals indicative of the position of each isolated light peak with respect to reference point 24, which signals can be acquired and analyzed by data processor 37. While a typical four-f correlator is employed in the example shown in FIG. 5 for sake of simplicity, it is to be understood that any other type optical correlator or processor using a different architecture, such as a joint-transform correlator, may be employed.

In FIG. 6, the position encoder 10 is used to detect a spot-like light source object 74 either of a generating or of a reflecting type. In this embodiment, the light spot image is formed by an input optical element such as lens 76 defining an input optical axis 78 generally aligned with optical axis 26 of the encoding device 10, which generates through detectors 34 one or more encoded signals indicative of the position of the light spot image with respect to the reference point, as explained before with reference to FIGS. 1 to 3. Depending on the characteristics of the light, a filter (not shown) can be used before the diffractive element 12 to narrow the electromagnetic radiation spectrum sufficiently to allow the encoder to work properly. In this embodiment, the data processor 37 is programmed to be responsive to the generated encoded signals to derive therefrom a further signal indicative of an absolute position of the light spot in a two-dimensional coordinates reference system generally designated at 80 extending within a reference plane substantially normal to the input optical axis 78. Typically, this embodiment is used where the spot-like object is displaced relatively to the encoding device. In an alternate embodiment used for applications where the device is also displaced relatively to the object such as in tracking applications, the data processor 37 is programmed to be responsive to the encoded signals to derive therefrom a further signal indicative of a relative position of the spot-like object 74 in a two-dimensional coordinates system designated by dotted lines 80' which extends within a reference plane substantially normal to input optical axis 78 of input optical element 76 and having its origin 82 at an intersection of optical axis 78 with the reference plane. In both embodiments, the position of the spot-like object is determined at very high speed, allowing detection or tracking of very fast moving objects.

We claim:

1. An optical device for encoding the position of a light spot image formed at an input image plane, said device comprising:

a diffractive optical element disposed within said input image plane and including an array of diffractive cells each being disposed at a predetermined position with respect to a predetermined reference point on said diffractive optical element, each said cells being capable of generating a unique optical diffraction pattern when illuminated, at least one of said cells being positioned to receive said light spot input image generating its unique optical diffraction pattern accordingly at an output image plane; and one or more optical detectors disposed at said output image plane and responsive to said unique optical diffraction pattern to generate one or more encoded signals indicative of the position of said light spot image with respect to said reference point.

2. The optical device of claim 1, wherein each said diffractive cell is formed by a unique arrangement of diffractive sub-cells.

3. The optical device of claim 1, wherein said an array of diffractive cells is a linear array of diffractive cells, each being formed by a unique arrangement of diffractive sub-cells.

4. The optical device of claim 1, wherein said an array of diffractive cells is a two-dimensional array of diffractive cells, each being formed by a unique arrangement of diffractive sub-cells.

5. The optical device of claim 1, wherein each said diffractive cells is one of a transmissive diffractive cell and a reflective diffractive cell.

6. The optical device of claim 1, wherein there is a plurality of said optical detectors being responsive to respective complementary portions of said unique optical diffraction pattern.

7. The optical device of claim 6 wherein at least one of said complementary portions of said optical diffraction pattern is characterized by an intensity value included within one of a pair of separate intensity value ranges each corresponding to a respective one of binary code values, at least one of said encoded signals being a binary encoded signal.

8. The optical device of claim 7, wherein at least a further one of said complementary portions of said unique optical diffraction pattern is characterized by an intensity value included within a continuous range of intensity values, at least a further one of said encoded signals being an analog encoded signal.

9. The optical device of claim 6, wherein at least one of said complementary portions of said optical diffraction pattern is characterized by an intensity value included within a continuous range of intensity values, at least one of said encoded signals being an analog encoded signal.

10. The optical device of claim 1, wherein said output image plane is a far-field image plane, said optical device further comprising an output optical element for collecting, directing and focusing said optical diffraction pattern at said far-field image plane.

11. The optical device of claim 1, wherein said unique diffraction pattern is characterized by an intensity value included within a continuous range of intensity values, at least one of said encoded signals being an analog encoded signal.

12. The optical device of claim 1, further comprising data processor means responsive to said encoded signals to derive therefrom a further signal indicative of an absolute position of said light spot in a reference system.

13. The optical device of claim 12, wherein said light spot image is formed by an input optical element defining an input optical axis, wherein said reference system is a two-dimensional coordinates system extending within a reference plane substantially normal to said input optical axis.

14. The optical device of claim 12, wherein said light spot image is formed by an input optical element, said light spot being produced by a laser projecting a laser beam toward a reflecting surface of an object and along a direction of incidence forming a predetermined angle with respect to a reference direction, said reference system being a three-dimensional coordinates system, said processor means deriving said absolute position of the light spot formed on the object through triangulation calculation.

15. The optical device of claim 14, wherein said laser is provided with means for varying the direction of incidence of said laser beam to scan the surface of the object forming said light spot, said data processor means repeatedly deriving said further signal indicative of the absolute position of said light spot in the reference system as said surface is scanned to measure the profile thereof.

16. The optical device of claim 14, further comprising means for imparting a relative movement between said laser and the object to scan the surface thereof reflecting said light spot accordingly, said data processor means repeatedly deriving said further signal indicative of the absolute position of said light spot in the reference system as said surface is scanned to measure the profile thereof.

17. The optical device of claim 1, wherein said light spot image is formed by an input optical element defining an input optical axis, said device further comprising data processor means responsive to said encoded signals to derive therefrom a further signal indicative of a relative position of said light spot in a two-dimensional coordinates system extending within a reference plane substantially normal to said input optical axis and having its origin at an intersection of said optical axis with said reference plane.

18. An optical device for encoding the position of a light peak generated by an optical processor receiving an image to be processed as generated by an imaging device illuminated by a laser source, said processor comprising first Fourier transform means for performing the Fourier transform of said input image to generate a corresponding transformed input image in the spatial frequency domain within an area defined by a Fourier transform filter plane, optical mask means disposed within said area, said second optical mask means implementing a filter mask function to generate a combined image in the spatial domain, and second Fourier transform means for performing the inverse Fourier transform of said combined image to generate said light peak at a peak image plane, said optical device comprising:
  a diffractive optical element disposed within said peak image plane and including an array of diffractive cells each being disposed at a predetermined position with respect to a predetermined reference point on said diffractive optical element, each said cells being capable of generating a unique optical diffraction pattern when illuminated, at least one of said cells being positioned to receive said light peak and generating its unique optical diffraction pattern accordingly at an output image plane; and
  one or more optical detectors disposed at said output image plane and responsive to said optical diffraction pattern to generate one or more encoded signals indicative of the position of said light peak with respect to said reference point.

19. The optical device of claim 18, wherein each said diffractive cell is formed by a unique arrangement of diffractive sub-cells.

20. The optical device of claim 18, wherein said an array of diffractive cells is a linear array of diffractive cells, each being formed by a unique arrangement of diffractive sub-cells.

21. The optical device of claim 18, wherein said an array of diffractive cells is a two-dimensional array of diffractive cells, each being formed by a unique arrangement of diffractive sub-cells.

22. The optical device of claim 18 wherein there is a plurality of said optical detectors being responsive to respective complementary portions of said unique optical diffraction pattern.

23. The optical device of claim 22, wherein at least one of said complementary portions of said optical diffraction pattern is characterized by an intensity value included within one of a pair of separate intensity value ranges each corresponding to a respective one of binary code values, at least one of said encoded signals being a binary encoded signal.

24. The optical device of claim 23, wherein at least a further one of said complementary portions of said optical diffraction pattern is characterized by an intensity value included within a continuous range of intensity values, at least a further one of said encoded signals being an analog encoded signal.

25. The optical device of claim 22, wherein at least one of said complementary portions of said optical diffraction pattern is characterized by an intensity value included within a continuous range of intensity values, at least one of said encoded signals being an analog encoded signal.

26. The optical device of claim 22, wherein at least one of said plurality of optical detectors is responsive to a further portion of said unique optical diffraction pattern that is characterized by an intensity value included within a continuous range of intensity values, to generate a further analog encoded signal indicative of the intensity of said light peak.

27. The optical device of claim 18, wherein said output image plane is a far-field image plane, said optical device further comprising an output optical element for collecting, directing and focusing said optical diffraction pattern at said far-field image plane.

28. The optical device of claim 18, wherein said unique diffraction pattern is characterized by an intensity value included within a continuous range of intensity values, at least one of said encoded signals being an analog encoded signal.

29. A method of encoding the position of a light spot, said method comprising the steps of:
  a) forming an image of said light spot at a corresponding position within an input image plane and with respect to a predetermined reference point of said plane;
  b) generating a unique optical diffraction pattern associated with said corresponding position at an output image plane; and
  c) detecting said unique optical diffraction pattern to generate one or more encoded signals indicative of the position of said light spot image with respect to said reference point.

30. The method of claim 29, wherein said detecting step c) includes separately detecting complementary portions of said unique optical diffraction pattern to generate corresponding ones of said encoded signals.

31. The method of claim 30, wherein at least one of said complementary portions of said optical diffraction pattern is characterized by an intensity value included within one of a pair of separate intensity value ranges each corresponding to a respective one of binary code values, at least one of said encoded signals being a binary encoded signal.

32. The method of claim 31, wherein at least a further one of said complementary portions of said optical diffraction pattern is characterized by an intensity value included within a continuous range of intensity values, at least a further one of said encoded signals being an analog encoded signal.

33. The method of claim 30, wherein at least one of said complementary portions of said optical diffraction pattern is characterized by an intensity value included within a continuous range of intensity values, at least one of said encoded signals being an analog encoded signal.

34. The method of claim 29, wherein said unique diffraction pattern is characterized by an intensity value included within a continuous range of intensity values, at least one of said encoded signals being an analog encoded signal.

35. The method of claim 29, further comprising the step of:
   d) deriving from said encoded signals a further signal indicative of an absolute position of said light spot in a reference system.

36. The method of claim 35, wherein said reference system is a two-dimensional coordinates system extending within a reference plane substantially normal to an input optical axis extending through said input image plane.

37. The method of claim 35, wherein said light spot is produced by a laser projecting a laser beam toward a reflecting surface of an object and along a direction of incidence forming a predetermined angle with respect to a reference direction, said reference system being a three-dimensional coordinates system, said deriving step d) being performed using triangulation calculation.

38. The method of claim 37, wherein said light spot is produced while varying the direction of incidence of said laser beam to scan the surface of said object reflecting said light spot accordingly, said deriving step d) being repeatedly performed as said surface is scanned to measure the profile thereof.

39. The method of claim 37, wherein said light spot is produced while imparting a relative movement between said laser and the object to scan the surface thereof forming said light spot, said deriving step d) being repeatedly performed as said surface is scanned to measure the profile thereof.

40. The method of claim 29, further comprising the step of:
   d) deriving from said encoded signals a further signal indicative of a relative position of said light spot in a two-dimensional coordinates system extending within a reference plane substantially normal to an input optical axis extending through said input image plane, said reference plane having its origin at an intersection of said optical axis with said reference plane.

* * * * *